United States Patent [19]

Garner et al.

[11] Patent Number: 4,857,676

[45] Date of Patent: Aug. 15, 1989

[54] MAGNETICALLY PERMEABLE PARTICLES IN TELECOMMUNICATIONS CABLE

[75] Inventors: John N. Garner; G. Douglas Baxter; James C. Grant, all of Kingston, Canada

[73] Assignee: Northern Telecom Limited, Montreal, Canada

[21] Appl. No.: 256,931

[22] Filed: Oct. 13, 1988

[51] Int. Cl.[4] .......................... H01B 11/12; H04B 3/26

[52] U.S. Cl. ........................................ 178/45; 118/325; 427/117; 427/118; 427/120; 427/286

[58] Field of Search .............. 178/45, 46, 63 D, 63 E; 333/22 R; 118/325; 427/117, 118, 120, 286

[56] References Cited

U.S. PATENT DOCUMENTS

| | | | |
|---|---|---|---|
| 4,565,591 | 1/1986 | Shannon | 178/45 |
| 4,638,272 | 1/1987 | Ive | 178/45 |

*Primary Examiner*—Stafford D. Schreyer
*Attorney, Agent, or Firm*—R. J. Austin

[57] ABSTRACT

Method of making insulated conductor wire in which a homogeneous mixture of a dielectric carrier and magnetically permeable particles is sprayed onto the wire to deposit a layer of the mixture on the wire. The layer is then hardened to provide an insulating layer with the particles substantially uniformly dispersed therein.

20 Claims, 3 Drawing Sheets

MAGNETICALLY PERMEABLE PARTICLES IN TELECOMMUNICATIONS CABLE

This invention relates to telecommunications cable comprising magnetically permeable particles.

Throughout the development and history of telecommunications cable, there has been spasmodic interest in a cable type in which is provided an insulation layer of plastic material around a conductor wire, the insulation layer comprising dielectric material carrying magnetically permeable particles homogeneously dispersed therein. A reason for wishing to produce this structure is to provide for inductive loading in use of such insulated conductors and in which the dispersed particles produce the loading. Disclosures of this type of loading structure always show the loaded layer as unbroken from end-to-end of a conductor wire.

Although many patents have issued on the subject of telecommunications cable incorporating such particles in insulation of layers of conductor wire, cables of such structure have seemingly never reached commercial standing and acceptance. In view of the advantages in being able to obtain an inductive loading of this type around a conductor wire, the lack of its commercial availability may not be understandable, unless it is realized that this type of inductive loading has been extremely difficult, and perhaps impossible, to produce on a continuous basis.

Insulation layers are conventionally applied to conductor wire by extrusion processes. Thus, in preparation for following this procedure in the manufacture of an insulated conductor wire bearing the above type of inductive loading, magnetically permeable particles have been thoroughly and evenly mixed with the molten insulation material. Extrusion then follows. The magnetically permeable particles, such as ferrite particles, are extremely abrasive and, during extrusion, the particles wear away the materials of an extruder head, especially around the extrusion orifice, at an unacceptably fast rate. This results in a progressive increase in the diameter of insulated conductor wire during production of a single run of the product, thereby causing the electrical properties of the product to depart from outside their design limits. Increase in diameter of the insulated conductor wire also makes it difficult to form a core comprising a large number of such insulated wires (i.e. up to 3600) and which has an outer diameter lying below a maximum dimensional limit. It is essential to maintain cable diameters below a certain specific limit if the cables are to be located in ducting below ground where there are rigid space restrictions. A further problem with extruder heads wearing at unacceptably fast rates is that frequent changing of expensive extruder equipment is necessary. The "downtime" for the equipment further increases the expense of insulating a conductor wire with insulation impregnated with magnetically permeable particles. Also wear, on the extruder head limits the maximum length of insulated conductor which may be produced.

The present invention relates to a method which seeks to provide an insulated conductor wire in which magnetically permeable particles are dispersed around a conductor wire in a more acceptable and economic fashion.

Accordingly, the present invention provides a method of making an insulated conductor wire including a layer of carrier material impregnated with magnetically permeable particles dispersed therein and surrounding the wire comprising providing a homogeneous mixture of a flowable dielectric carrier material and magnetically permeable particles dispersed therein, spraying said mixture in the direction of a conductor wire to cause the mixture to form a deposit surrounding the wire, and hardening the layer so formed.

Any suitable carrier material, perhaps one including solvents to facilitate drying and hardening, e.g. paints, may be used. In addition, catalyzed plastic materials, liquid, or molten plastics may be used and ultraviolet treatment methods may be used to harden certain materials. The carrier material may also comprise suitable glues or ink pigment carriers.

In a preferred method, the deposit is formed as bands of the mixture encircling the conductor wire, the bands being spaced apart along the wire. In another method, the deposit is formed as a surrounding layer extending end-to-end of the conductor wire.

In a preferred method, a layer of dielectric material is extruded onto the conductor wire and then the deposit is formed onto the dielectric layer by spraying. Alternatively, the deposit is formed directly onto the conductor wire and a layer of dielectric material extruded around it for insulation purposes. With this latter method however, it should be borne in mind that it may have some undesirable influence on the electrical current to be provided along the wire. In addition, adhesion of the deposit of the mixture of magnetically permeable particles and carrier material to the wire may present problems.

The invention further includes apparatus for making an insulated conductor wire comprising: an extrusion head for extruding a dielectric layer around the wire, said dielectric layer devoid of magnetically permeable particles; and a spray device for directing towards the wire, a homogeneous mixture of a dielectric carrier material and magnetically permeable particles dispersed therein so as to deposit a layer of said mixture around the wire; the extrusion head and spray device being spaced-apart along a passline for the wire.

The invention also includes an insulated conductor wire comprising a conductor wire surrounded by a layer of dielectric material and a hardened sprayed deposit comprising a mixture of a dielectric carrier material having magnetically permeable particles dispersed therein.

Embodiments of the invention will now be described by way of example with reference to the accompanying drawings in which:

FIG. 4 is an isometric view of part of an insulated conductor wire according to a second embodiment;

FIG. 6 is an isometric view of part of an insulated conductor wire according to a third embodiment;

Figure 1:
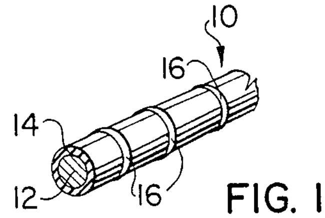
FIG. 1 is an isometric view of part of an insulated conductor according to a first embodiment.

As shown in FIG. 1, an insulated conductor wire 10 for use in a telecommunications cable comprises a wire 12 surrounded by an insulation comprising a layer 14 of dielectric material. Surrounding the layer 14 are bands 16 which encircle the layer 14 and are spaced apart along the wire. Each band is formed as a sprayed deposit of dielectric material carrying magnetically permeable particles dispersed substantially uniformly therein. The layer 14 may be any suitable dielectric material such as a polyolefin, e.g. polyethylene, or a polyvinylchloride compound. The dielectric carrier material of each of the bands 16 is preferably one which is compatible with the material of the layer 14 so as to stick to it. When the layer 14 is a polyolefin material, then the dielectric carrier material of the bands 16 may also be a polyolefin or even certain paints, catalyzed plastic liquids, glues, ink pigment carriers or molten plastics which may be cured by ultraviolet treatment. Where the layer 14 is formed from a polyvinylchloride composition, then if the dielectric carrier material of the bands 16 is to be formed from a polyolefin, then this is preferably a chlorinated material to enable it to stick to the layer 14.

Figure 2:
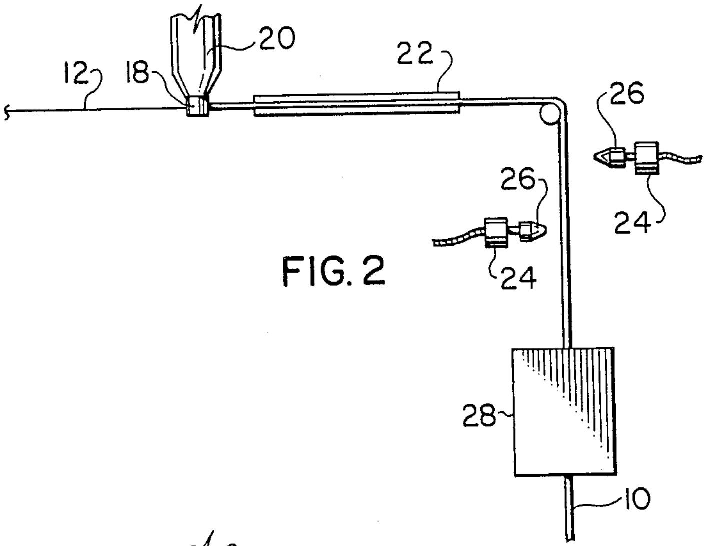
FIG. 2 is a diagrammatic side elevational view of apparatus used for insulating a conductor wire to provide the insulated wire of the first embodiment.

The insulated conductor 10 is made by the apparatus shown in FIG. 2. The conductor wire 12 is passed through an extruder head 18 which is provided with the molten plastics material for layer 14 from extruder 20. The wire bearing the layer 14 then passes through a cooling trough 22 of conventional design so as to cool and harden the material of the layer 14. To provide the bands 16, a homogeneous mixture of the dielectric carrier material in flowable form and the magnetically permeable particles is prepared. This mixture is then passed under pressure through spraying equipment 24 (FIG. 2) in a suitable enclosure (not shown) and is sprayed through sprayer nozzles of two spray heads 26 which are spaced apart around the passline for the wire 12 at different specific stations along the passline. To obtain the bands 16, the spray heads are moved (by means not shown) either by reciprocation or oscillation, to direct the mixture at and to each side of the layer 14 on the wire. This spray head movement is synchronized with the throughput speed of the wire so that they coact to form complete annular bands 16 around the wire. The axial length and distance between the bands 16 depends on the speed of movement of the sprayer nozzles in relation to the throughput speed of the wire 12. The thickness of each band is also controlled by these two speeds and the output speed of the mixture from the nozzles. It is preferable for the wire to be oriented in a vertical direction, as shown by FIG. 2, so as to assist in forming each of the bands 16 in a substantially constant thickness around the wire.

After passing the spraying heads 26, the wire bearing the undried bands 16 then passes through a chamber 28 for drying and hardening the bands 16. The chamber 28 is either a drying or curing chamber, such as an ultraviolet curing chamber, dependent upon the type of drying operation required for the dielectric carrier material.

In the use of the above process, the thickness and distance apart of the bands 16 may be accurately controlled by controlling the pressure upon the material being sprayed, changing the throughput feed speed of the wire past the spray heads, or changing the speed of spray head movement as necessary. In addition, the bands 16 may be made extremely thin if required. The thickness of each band 16 may be substantially below thicknesses which may easily be produced by conventional extrusion techniques. Furthermore, the ferrite material is extremely abrasive, and is capable of wearing out expensive items of equipment such as extrusion heads. However, by the use of the inventive method and in this embodiment, the ferrite material only wears the material of the nozzles of spray heads 26 and the nozzles are quickly, easily, and cheaply replaced without long downtime for the in-line apparatus.

Furthermore, during a single run of certain determined length, if the material around the spray orifices of the spray heads gradually wears so as to progressively enlarge the orifices, a monitoring device may be used to monitor the thickness of the bands 16 emerging from the spray heads or from the chamber 28. For instance, a monitoring device could comprise a means for creating a magnetic field through which the banded wire is fed. The magnetically permeable material in the bands affect the magnetic flux in the field. If the bands increase in thickness, this would change the effect on the magnetic flux in the field, thereby indicating the thickness change. Alternatively, the banded wire may be fed through an inductor coil which is energized. The inductance of the coil is influenced by the quantity of magnetically permeable particles within the coil at any particular moment, the quantity, of course, being affected by the thickness of the bands. A signal could be produced corresponding to the inductance, thereby indicating any change in thickness of the bands. Dependent upon the monitored thickness and to compensate for the enlarging orifice size, signals received from the monitoring device cause one of the above variables to be controllably altered as necessary to control the thickness of the bands 16 within certain narrow limits. This control is conveniently performed by computer operation dependent upon the received thickness monitoring signals.

As can be seen from the above embodiment therefore, spray deposited bands of material carrying a dispersion of magnetically permeable particles may be easily and cheaply made and suitable controls provided to ensure that constancy in thickness of the bands is provided while also ensuring that a sufficiently long run of the product is obtained. It follows that wearing of the spray nozzles does not result in progressive increase in thickness of the bands 16 to cause the electrical properties to depart from those desired. Compensating for spray nozzle wear ensures controlled thickness and the maintenance of desired electrical properties.

Figure 3:
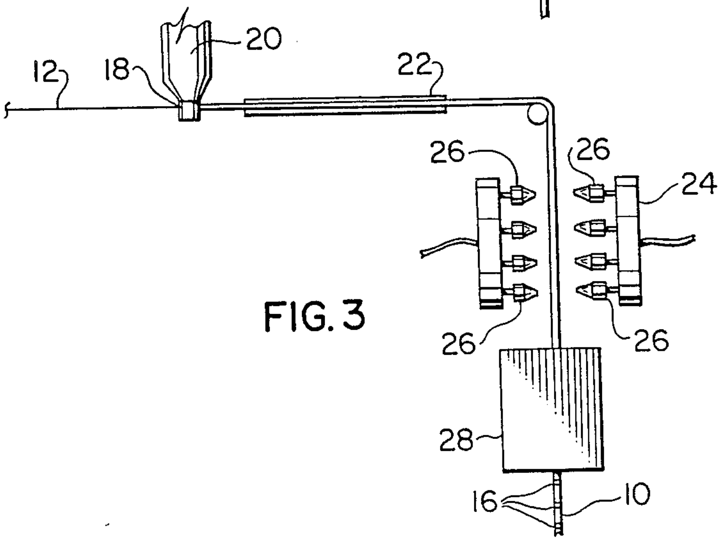
FIG. 3 is a view similar to FIG. 2 of an alternative apparatus.

In alternative apparatus shown in FIG. 3, two or more banks of spray heads 26 having spray nozzles may be used. As the spray nozzles of each bank are spaced a fixed distance apart, careful control of the speed of spray head movement and wire throughput speed is essential if the bands 16 are to be at substantially equal distances apart.

As a further alternative (not shown), a single oscillating or reciprocating spray head is used instead of two. The spray from the ingle head will encircle the wire to complete annular bands, but each band may be thicker at the part facing the spray head than parts further around the bands.

In a second embodiment, which has the same advantages as discussed for the first embodiment, an insulated conductor wire 30 shown in FIG. 4, has a conductor wire 32 surrounded by spray deposited bands 34 comprising a dielectric carrier material carrying a uniform dispersion of ferrite particles. Surrounding the bands 34 is a layer 36 of dielectric material devoid of the ferrite particles. Thus, in the embodiment of FIG. 4, the deposited bands and the layer of insulation are reversed in position compared to FIG. 1.

Figure 5:
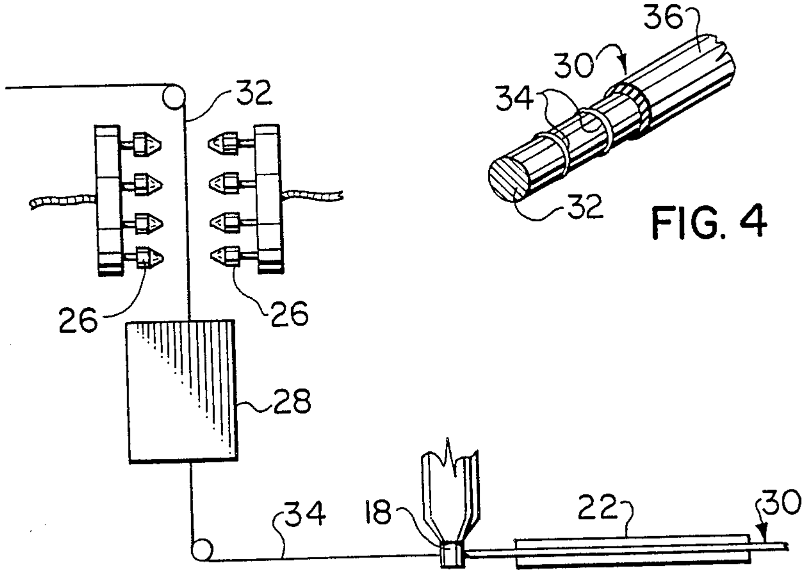
FIG. 5 is a diagrammatic side elevational view of apparatus for insulating the conductor wire to form the insulated wire of the second embodiment.

In the manufacture of the insulated wire 30, shown in FIG. 5, the wire 32 is first passed in a vertical direction and past the spraying heads 26 so as to form the bands 34 in a molten form. The wire carrying these bands is then passed through the chamber 28 for hardening the bands. The layer 36 is then applied by normal extrusion techniques by passing the wire 32 bearing the bands 34 through the extrusion head 18.

In a third embodiment (FIG. 6), an insulated conductor wire 38 comprises a conductor wire 32 surrounded by an insulation layer 40 of dielectric material devoid of ferrite particles. Surrounding the layer 40 is a spray deposited helical band 42 of a dielectric carrier material carrying a uniform dispersion of ferrite particles.

Figure 7:
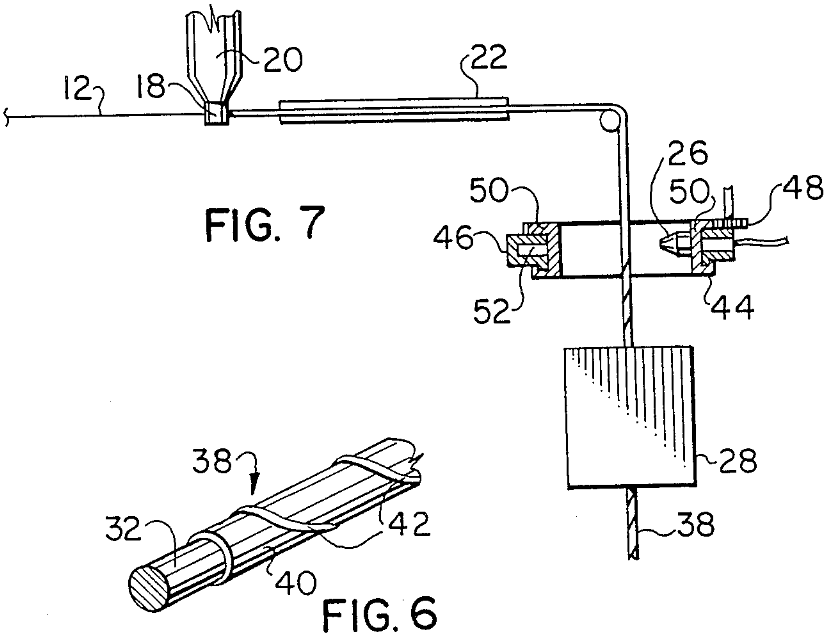
FIG. 7 is a view similar to FIG. 2 of apparatus for forming the insulated wire of the third embodiment.

The insulated wire 38 is made with the apparatus shown in FIG. 7. In this apparatus, an extruder head 18 is provided for forming the insulation layer 40, followed in a downstream direction along the passline for wire 32 by a cooling trough 22. Downstream from the cooling trough, a sprayer nozzle 26 is disposed to form the helical band 42. The sprayer nozzle is continuously rotatable around the passline for the wire while being directed for spraying a mixture of dielectric carrier material in flowable form and which contains the magnetically permeable particles. For rotational purposes, the spray nozzle is mounted upon a ring 44 encircling the passline, the ring being mounted in bearings upon an annular support 46 and rotatable around the passline by a suitable drive gear 48 engaging a peripheral gear 50 on ring 44. The annular support 46 and ring 44 define an annular chamber 52 for supplying the sprayer nozzle with the pressurized mixture supplied from a source, with rotatable seals (not shown) provided between the support 46 and ring 44.

In use, the sprayer head is rotated continuously as the wire 32 bearing the layer 40 is passed through the ring 44. The pitch of the helix of the band 42 is dependent upon the speeds of rotation of the ring 44 and of the throughput speed of wire 32.

Figure 8:
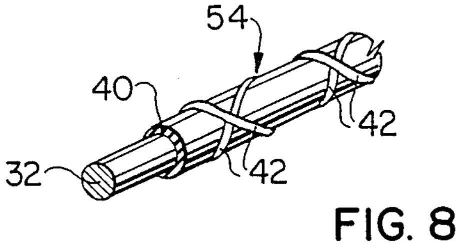
FIG. 8 is a view similar to FIG. 6 of a fourth embodiment.

In a fourth embodiment, an insulated wire 54 (FIG. 8), comprises a conductor wire 32 surrounded, as in the third embodiment, by an insulation layer 40. In this embodiment, however, there are two spray deposited helical bands 42 of dielectric material carrying a uniform dispersion of ferrite particles. These bands extend in opposite directions around the wire.

Figure 9:
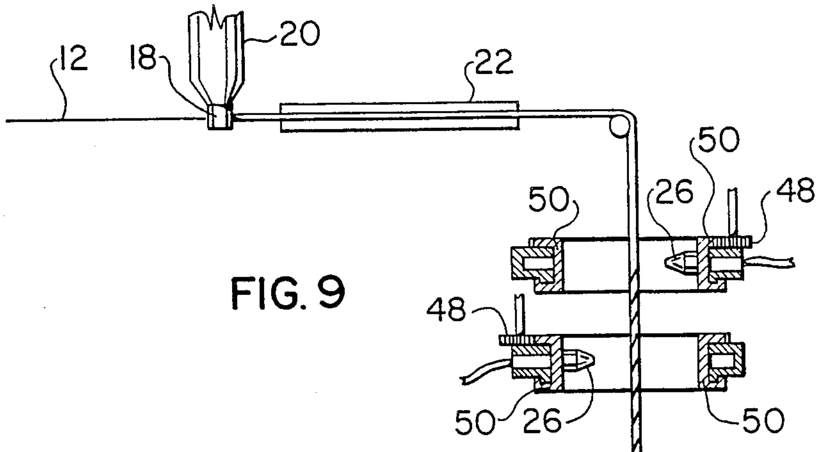
FIG. 9 is a view similar to FIG. 2 of apparatus for forming the insulated wire of the fourth embodiment.

Apparatus for making the insulated wire 54 is shown in FIG. 9. This apparatus is basically of the construction shown in FIG. 7, except that it has two sprayer nozzles 26 located in specific locations along the wire passline. Each sprayer nozzle is rendered rotatable in the manner described with reference to FIG. 7 except that the nozzles are counter-rotating so as to form the bands extending around the wire in opposite directions.

In modifications of the third and fourth embodiments (not shown), the or each helical band 42 is provided directly upon wire 32 and beneath the insulation layer 40. This structure is provided by placing the sprayer nozzles 26 and curing or drying chamber 28 upstream of the extruder head 18.

In fifth and sixth embodiments, the bands 16 and 34 are replaced by spray deposited layers of hardened dielectric carrier material carrying a uniform dispersion of ferrite particles.

Figure 10:
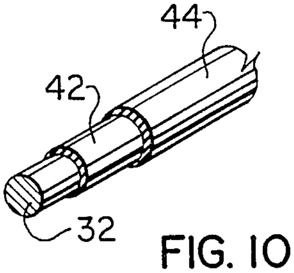
FIGS. 10 and 11 are isometric views of parts of insulated conductors according to third and fourth embodiments.
Figure 11:
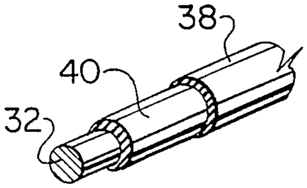

In the fifth embodiment (FIG. 11), a deposited layer 38 of the mixture of carrier material surrounds and extends from end-to-end of the underlying insulation layer 40 of dielectric material devoid of ferrite particles. In the sixth embodiment (FIG. 10), a deposited layer 42 of the mixture extends end-to-end of the wire and underlies an insulation layer 44.

The continuous end-to-end layers of the fifth and sixth embodiments may be obtained with the appropriate apparatus of FIGS. 2, 3 and 5 by holding the spray heads stationary with the nozzles directed permanently towards the wire passline during operation.

What is claimed is:

1. A method of making an insulated conductor wire including a layer of carrier material impregnated with magnetically permeable particles dispersed therein and surrounding the wire comprising:

providing a homogeneous mixture of a flowable dielectric carrier material and magnetically permeable particles dispersed therein, spraying said mixture in the direction of a conductor wire to cause the mixture to form a deposit of the mixture surrounding the wire; and hardening the layer so formed with the magnetically permeable particles substantially uniformly dispersed therein.

2. A method according to claim 1 comprising forming the deposit of the mixture as annular bands of the mixture encircling the conductor wire, the annular bands being spaced-apart along the wire.

3. A method according to claim 2 comprising:

moving the conductor wire longitudinally along a passline;

and forming the bands by spraying the mixture continuously from a plurality of sprayer nozzles disposed at different positions angularly around the passline while moving the nozzles to-and-fro to direct the mixture at and to each side of the passline.

4. A method according to claim 1 comprising forming the deposit of the mixture as at least one helical band extending around and axially of the conductor wire.

5. A method according to claim 4 comprising:

moving the conductor wire longitudinally along a passline;

and forming the helical band by continuously rotating a sprayer nozzle around the passline in a specific station along the passline while spraying the mixture continuously from the sprayer nozzle.

6. A method according to claim 1 comprising forming the deposit of the mixture as two helical bands, the two helical bands extending axially of the conductor wire while extending in opposite directions around the conductor wire.

7. A method according to claim 6 comprising:

moving the conductor wire longitudinally along a passline;

and forming the two helical bands by continuously rotating two counter-rotating sprayer nozzles around the passline in specific stations along the passline while spraying the mixture continuously from the spray nozzles.

8. A method according to claim 1 comprising forming the deposit of the mixture as a surrounding layer extending end-to-end of the conductor wire.

9. A method according to claim 1 comprising forming an inner layer on the wire by extruding a layer of dielectric material devoid of magnetically permeable particles onto the conductor wire and then applying the deposit of the mixture onto the inner layer by spraying the mixture onto the inner layer.

10. A method according to claim 1 comprising providing the deposit of the mixture directly onto and surrounding the conductor wire by spraying the mixture onto the conductor wire and then providing a layer of insulation surrounding the deposit of the mixture by extruding a layer of dielectric material devoid of magnetically permeable particles onto the deposit.

11. Apparatus for making an insulated conductor wire comprising:

an extrusion head for extruding a dielectric layer around the wire, said dielectric layer devoid of magnetically permeable particles; and a spray device for directing towards the wire, a homogeneous mixture of a dielectric carrier material and magnetically permeable particles dispersed therein so as to deposit a layer of said mixture around the wire;

the extrusion head and spray device being spaced-apart along a passline for the wire.

12. Apparatus according to claim 11 wherein the spray device comprises at least two sprayer nozzles disposed at different positions angularly around the passline, the nozzles movable to-and-fro to direct the mixture at and to each side of the passline.

13. Apparatus according to claim 11 wherein the spray device comprises a sprayer nozzle which is continuously rotatable around the passline while being directed towards the passline so as to form the layer as a helical band extending around and axially of the conductor wire.

14. Apparatus according to claim 11 wherein the spray device comprises two sprayer nozzles disposed in specific stations along the passline, the two nozzles being counter-rotating around the passline while being directed towards the passline so as to form two layers of the mixture as two helical bands extending axially of the conductor wire while extending in opposite directions around the conductor wire.

15. An insulated conductor wire comprising a conductor wire surrounded by a layer of dielectric material devoid of magnetically permeable particles and a hardened sprayed deposit comprising a mixture of a dielectric carrier material having magnetically permeable particles substantially dispersed therein.

16. An insulated conductor wire according to claim 15 wherein the layer of dielectric material devoid of magnetically permeable particles is an inner layer surrounding the conductor wire and the hardened sprayed deposit comprises bands of the hardened mixture encircling the inner layer, the bands spaced-apart along the wire.

17. An insulated conductor wire according to claim 15 wherein the hardened sprayed deposit comprises bands of the hardened mixture encircling the conductor wire, the bands spaced-apart along the wire and the layer of dielectric material devoid of magnetically permeable particles surrounds the bands.

18. An insulated conductor wire according to claim 15 wherein the hardened sprayed deposit comprises a layer surrounding the conductor wire and extending end-to-end of the wire.

19. An insulated conductor wire according to claim 15 wherein the hardened sprayed deposit comprises a helical band of the mixture which extends around and axially of the conductor wire.

20. An insulated conductor wire according to claim 15 wherein the hardened sprayed deposit comprises two helical bands of the mixture which extend axially of the conductor wire while extending in opposite directions around the conductor wire.

* * * * *